(12) United States Patent
Landa et al.

(10) Patent No.: US 6,436,492 B1
(45) Date of Patent: Aug. 20, 2002

(54) VACUUM IG WINDOW UNIT WITH FIBER SPACERS

(75) Inventors: Leonid Landa, Jeannette; Anthony V. Longobardo, Mt. Pleasant; Ksenia A. Landa, Jeannette, all of PA (US); Steven L. Aggas, Pinckney, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/440,697

(22) Filed: Nov. 16, 1999

(51) Int. Cl.[7] .................................................. E06B 3/24
(52) U.S. Cl. ........................................ 428/34; 52/786.13
(58) Field of Search .............................. 428/34, 293.4, 428/293.7, 364; 52/786.1, 786.13

(56) References Cited

U.S. PATENT DOCUMENTS

| | | |
|---|---|---|
| 49,167 A | 1/1865 | Stetson |
| 1,370,974 A | 3/1921 | Kirlin |

(List continued on next page.)

FOREIGN PATENT DOCUMENTS

| | | | |
|---|---|---|---|
| FR | 2483564 | | 6/1980 |
| FR | 2 482 161 | | 11/1981 |
| JP | 50-156525 | * | 12/1975 |
| JP | 09-124347 | * | 5/1997 |
| WO | WO 99/48830 | | 9/1999 |

OTHER PUBLICATIONS

Patent Abstracts of Japan, vol. 1999, No. 09, Apr. 6, 1999, JP 11 092181, "Reduced Pressure Double Layer Glass and Its Production", Akira.
"Temperature–Induced Stresses in Vacuum Glazing: Modelling and Experimental Validation" by Simko, et. al., Solar Energy, vol. 63, No. 1, pp. 1–21, 1998.
"Fabrication of Evacuated Glazing at Low Temperature" by Griffiths, et. al., Solar Engery, vol. 63, No. 4, pp. 243–249, 1998.
"Thermal Outgassing of Vacuum Glazing" by Lenzen, et.al., School of Physics, Univ. of Sydney, NSW 2006, Australia.
"Current Status of the Science and Technology of Vacuum Glazing" by Collins, et. al., Solar Energy, vol. 62, No. 3, pp. 189–213, 1998.

*Primary Examiner*—Donald J. Loney
(74) *Attorney, Agent, or Firm*—Nixon & Vanderhye P.C.

(57) ABSTRACT

A vacuum insulating glass (IG) unit and method of making the same. A plurality of fiber spacers (e.g. glass fibers) are provided between first and second opposing substrates in order to space the substrates from one another and maintain a low pressure space therebetween. The fiber spacers may be randomly distributed in a viewing area of the unit, or distributed in approximately uniform rows and/or columns in different embodiments of the invention. In certain embodiments, the fibers may be substantially transparent to certain wavelengths of visible light to render the IG unit more aesthetically pleasing.

15 Claims, 3 Drawing Sheets

U.S. PATENT DOCUMENTS

| | | |
|---|---|---|
| 1,448,351 A | 3/1923 | Kirlin |
| 1,774,860 A | 9/1930 | Wendler et al. |
| 2,011,557 A | 8/1935 | Anderegg |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,486,482 A | 12/1984 | Kobayashi et al. |
| 4,514,450 A | 4/1985 | Nowobilski et al. |
| 4,683,154 A | 7/1987 | Benson et al. |
| 4,786,344 A | 11/1988 | Beuther |
| 4,824,215 A | 4/1989 | Joseph et al. |
| 4,874,461 A | 10/1989 | Sato et al. |
| 4,924,243 A | 5/1990 | Sato et al. |
| 4,983,429 A | 1/1991 | Takayanagi et al. |
| 5,124,185 A | 6/1992 | Kerr et al. |
| 5,157,893 A | 10/1992 | Benson et al. |
| 5,175,975 A | 1/1993 | Benson et al. |
| 5,234,738 A | 8/1993 | Wolf |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,499,128 A | 3/1996 | Hasegawa et al. |
| 5,596,981 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,834,891 A | 11/1998 | Novich |
| 5,855,638 A | 1/1999 | Demars |
| 5,891,536 A | 4/1999 | Collins et al. |
| 5,902,652 A | 5/1999 | Collins et al. |
| 6,049,370 A | 4/2000 | Smith, Jr. et al. |
| 6,212,852 B1 | 4/2001 | Tsai |

* cited by examiner

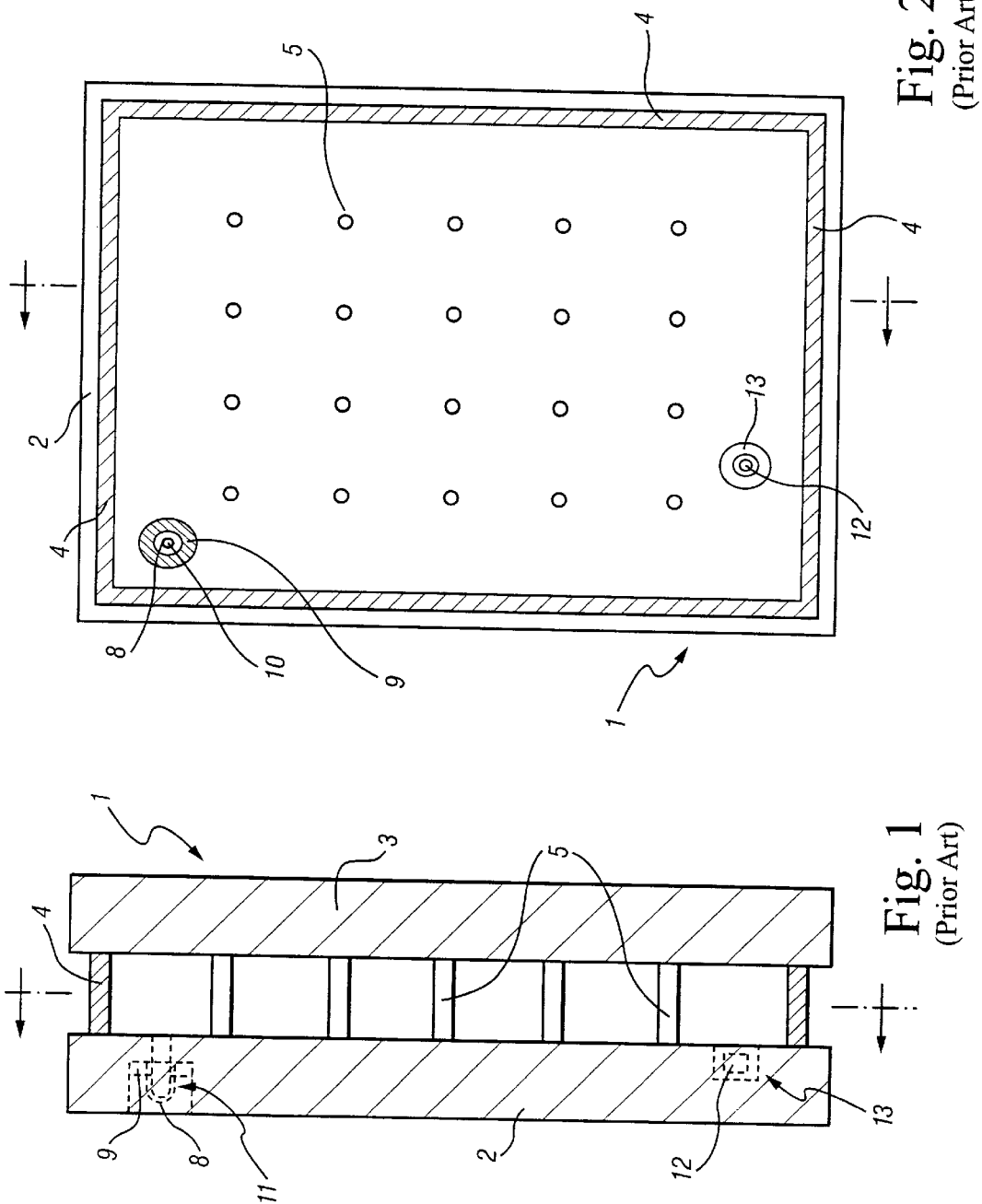

VACUUM IG WINDOW UNIT WITH FIBER SPACERS

This invention relates to a vacuum insulating glass (IG) unit, and a method of making the same. More particularly, this invention relates to a vacuum IG unit including fiber spacers.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space therebetween. Glass sheets 2 and 3 are interconnected by peripheral or edge seal of fused solder glass 4 and an array of support pillars or spacers 5.

Pump out tube 8 is sealed by solder glass 9 to an aperture or hole 10 which passes from an interior surface of glass sheet 2 to the bottom of recess 11. A vacuum is attached to tube 8 so that the cavity between sheets 2 and 3 can be evacuated to create a low pressure area. After evacuation, tube 8 is melted to seal the vacuum. Recess 11 retains melted and sealed tube 8. Chemical getter 12 may be included within machined recess 13.

Certain conventional pillars 5 disposed between the opposing substrates are either too soft (e.g. certain metals) or too hard (e.g. certain ceramics). These may cause either heat disturbances in the unit due to high thermal conductivity, and/or contact damage (e.g. cracks) in the glass substrate(s). Moreover, certain conventional sharp or compact pillar shapes may invoke significant point-loading on small areas of the glass substrate(s), especially in the case of pillar height variations, thereby leading to potential scratching and/or cracking of the substrate(s).

Still further, certain conventional metal pillars appear as colored, opaque, and/or light reflecting dots in the viewing area of the window. Some viewers may believe this to be aesthetically displeasing.

It is apparent from the above that there exists a need in the art for a vacuum IG unit, and corresponding method of making the same, including improved spacers between opposing glass sheets or substrates. There also exists a need in the art for fiber inclusive spacers for use in vacuum IG window units.

This invention will now be described with respect to certain embodiments thereof, accompanied by certain illustrations.

SUMMARY OF THE INVENTION

An object of this invention is to provide a vacuum insulating glass (IG) unit including a plurality of fiber or strand spacers horizontally aligned between the opposing glass substrates.

Another object of this invention is to provide a vacuum IG window unit including a plurality of substantially transparent fiber spacers between the opposing substrates. "Substantially transparent" means the spacers are at least about 70% transparent to at least some visible wavelengths of light.

Another object of this invention is to provide a vacuum IG window unit including a plurality of fiber spacers that are at least about 80%, most preferably at least about 90%, transparent to at least some (and most preferably all) wavelengths of visible light.

Another object of this invention is to provide a vacuum IG window unit including a plurality of elongated glass fiber spacers.

Another object of this invention is to provide a vacuum IG window unit including a plurality of elongated fiber spacers distributed in either a random or uniform manner across a viewing area of the unit in order to space the opposing glass substrates from another.

Another object of this invention is to provide a vacuum IG window unit including a plurality of fiber spacers having an index of refraction approximately the same as (i.e. within about 10% of) the index of refraction of at least one of the glass substrates.

Another object of this invention is to fulfill any and/or all of the above-listed objects.

Generally speaking, this invention fulfills any or all of the above described needs and/or objects by providing a thermally insulating glass panel comprising:

first and second spaced apart glass substrates defining a low pressure space therebetween having a pressure less than atmospheric pressure;

a plurality of elongated fiber spacers disposed between said first and second glass substrates across at least a portion of a viewing area of said panel for spacing said substrates from one another in order to maintain said low pressure space therebetween; and at least one seal disposed between said first and second glass substrates for hermetically sealing said low pressure space.

This invention further fulfills any or all of the above described needs and/or objects by providing a method of making a vacuum insulating glass (IG) window unit comprising the steps of:

providing first and second glass substrates;

providing a plurality of fiber spacers between the first and second substrates for spacing the substrates from one another so as to define a low pressure space therebetween having a pressure less than atmospheric pressure; and forming a seal for sealing the low pressure space between the substrates.

IN THE DRAWINGS

FIG. 1 is a prior art cross-sectional view of a conventional vacuum IG unit.

FIG. 2 is a prior art top plan view of the FIG. 1 vacuum IG unit, taken along the section line illustrated in FIG. 1 with the peripheral or edge seal being shown in cross-section.

DETAILED DESCRIPTION OF CERTAIN EMBODIMENTS OF THIS INVENTION

Figure 3:
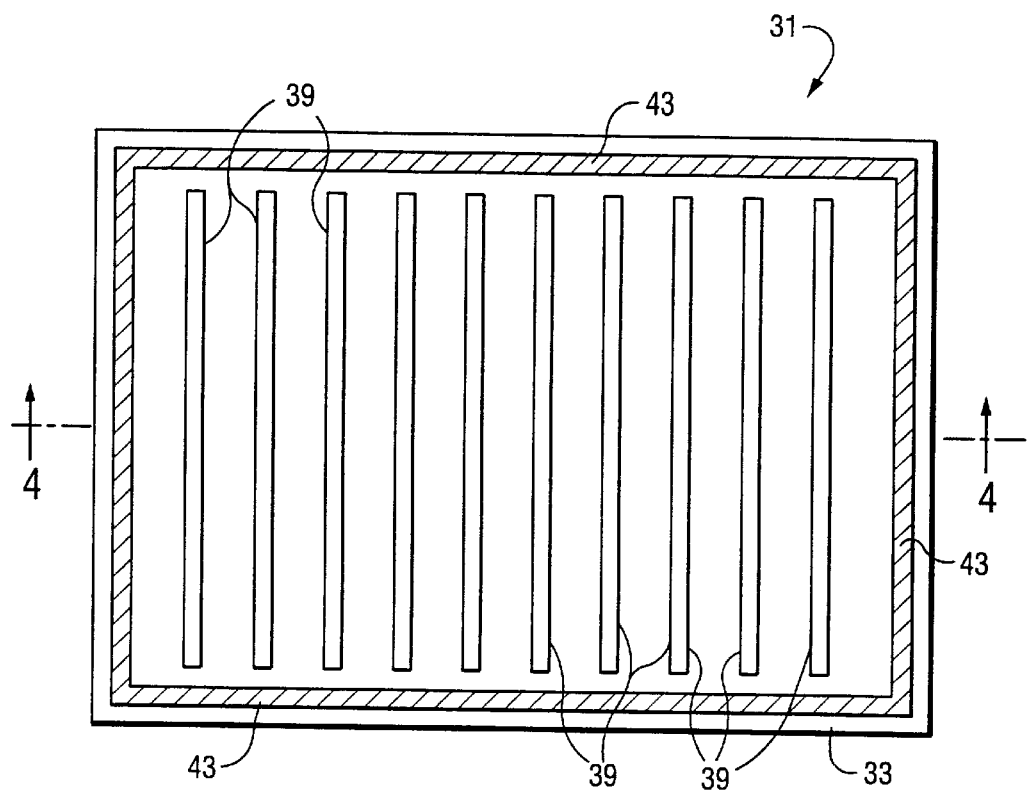
FIG. 3 is a top partial cross-sectional and partial elevation view of a vacuum IG window unit absent its upper substrate according to an embodiment of this invention.

Referring now more particularly to the accompanying drawings in which like reference numerals indicate like parts throughout the several views.

Certain embodiments of this invention relate to a vacuum IG window unit including fiber spacers, and/or a method of making the same. An edge seal as well as fiber spacers are provided between the opposing glass substrates. "Peripheral" and "edge" seals herein do not mean that the seals are located at the absolute periphery of the unit, but instead mean that the seal is at least partially located at or near (e.g. within about two inches) an edge of at least one substrate of the unit.

Figure 4:
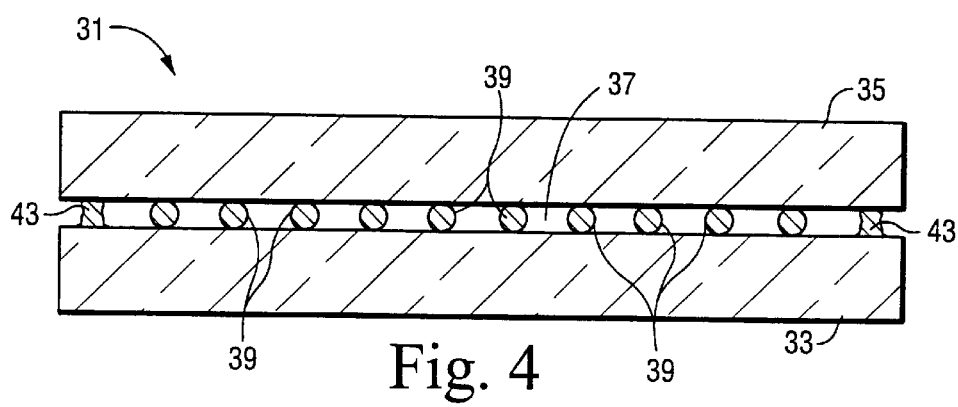
FIG. 4 is a side cross-sectional view of the FIG. 3 vacuum IG window unit taken along section line 4—4 (including the upper substrate).

FIGS. 3–4 illustrate a thermally insulating glass panel 31 according to an embodiment of this invention (note: the upper substrate is not shown in FIG. 3 for purposes of simplicity). Because interior space 37 between the opposing substrates is at a pressure lower or less than atmospheric in general, this type of panel is often referred to as a vacuum insulating glass (IG) unit.

Referring to FIGS. 3–4, vacuum IG unit or panel 31 includes first glass substrate 33, second glass substrate 35, low pressure or evacuated space 37 between substrates 33 and 35, elongated mineral fiber or strand spacers 39 for spacing the substrates 33, 35 from one another and supporting them, an optional pump out tube (not shown) disposed in a hole or aperture formed in substrate 33 for evacuating space 37, and peripheral or edge seal 43 that hermetically seals low pressure space 37 between substrates 33, 35 and which may bond the substrates to one another or hold them together. Substrates 33, 35 are substantially transparent to visible light (i.e. at least about 70% transparent, more preferably at least about 80% transparent, and most preferably at least about 90% transparent) in certain embodiments of this invention; although they may be deeply tinted in other embodiments.

In embodiments of this invention when a pump-out tube or other pump-out structure is utilized, the substrates are assembled around spacers 39 and edge seal 43 formed; and thereafter a vacuum is hooked up to the pump-out tube in order to evacuate sealed off space 37. In alternative embodiments where no pump-out tube is used, the vacuum IG unit 31 may be assembled in a vacuum chamber so that when edge seal 43 is formed the sealed off space 37 is already in an evacuated state.

Vacuum IG units 31 according to different embodiments of this invention may be used as residential or commercial windows. The evacuation of space 37 eliminates or reduces heat transport between glass substrates 33 and 35 due to gaseous conduction and convection. In addition, radiative heat transport between glass sheets 33 and 35 can be reduced to a low level by providing a low emittance (low-E) coating (s) on the internal surface of one or both of sheets 33, 35. High levels of thermal insulation can thus be achieved. Low gaseous thermal conduction may be achieved when the pressure in space 37 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. Edge seal 43 reduces or eliminates any ingress or outgress of gas or air to/from space 37.

In certain embodiments of this invention, edge seal 43 may be made of or include any of the following materials: solder glass, indium (In), Indalloy No. 53 available from Indium Corp. in paste or wire form having a composition of 67% Bi and 33% In (% by weight), Indalloy No. 1 from Indium Corp. in paste or wire form having a composition of 50% In and 50% Sn, Indalloy No. 290 available from Indium Corp. in paste or wire form having a composition of 97% In and 3% Ag, Indalloy No. 9 from Indium Corp. in paste or wire form having a composition of 70% Sn, 18% Pb and 12% In, Indalloy No. 281 available from Indium Corp. in paste or wire form having a composition of 58% Bi and 42% Sn, Indalloy No. 206 available from Indium Corp. in paste or wire form having a composition of 60% Pb and 40% In, Indalloy No. 227 available from Indium Corp. in paste or wire form having a composition of 77.2% Sn, 20% In and 2.8% Ag, Indalloy No. 2 available from Indium Corp. in paste or wire form having a composition of 80% In, 15% Pb and 5% Ag, Indalloy No. 3 available from Indium Corp. in paste or wire form having a composition of 90% In and 10% Ag, or any other suitable material.

Still referring to FIGS. 3–4, an array of elongated fiber spacers 39 is provided between substrates 33 and 35 in order to maintain separation of the two approximately parallel glass sheets 33 and 35 against atmospheric pressure. Fiber spacers 39 are horizontally aligned or oriented in low pressure space 37 between the substrates, so that they are aligned approximately perpendicular to the direction of normal light flow through vacuum IG window unit 31. In certain embodiments, each pillar may have a height, diameter, or thickness of from about 0.05 to 0.30 mm, which thus determines or relates to the thickness of low pressure space 37.

During manufacturing of vacuum IG unit 31, glass fiber spacers 39 may be fused onto substrates 33 and/or 35. In alternative embodiments, fibers 39 may be adhered to the substrate(s) 33, 35 by ion diffusion/exchange. Glass fiber spacers 39 may be fused to the opposing substrates during the formation of solder glass edge seal 43 or at any other suitable time during the manufacturing process. Alternatively, spacers 39 may have a low friction diamond-like carbon (DLC) or other coating thereon so as to be at least partially slidable relative to the glass substrate(s) in the final product.

As shown in FIGS. 3–4, the plurality of approximately parallel elongated fibers 39 function as spacers which maintain separation of substrates 33 and 35. The shape and distribution of fiber spacers 39 across the viewing area of window unit 31 enables the loading or weight distribution to be approximately evenly distributed across the interior major surfaces of the substrates under evacuation of space 37.

In certain preferred embodiments, spacers 39 may be of or include glass fibers (e.g. silica fibers, multi-component glass fibers, fiber glass, or the like). In such embodiments, spacers 39 include glass and optionally glass-forming or modifying components. In certain embodiments, fiber spacers 39 may be of a glass fiber material such as that used by Guardian Fiberglass, Albion, Mich.

Thermal properties of the spacer material which are of significance in vacuum IG units, such as thermal expansion coefficient and temperatures related to the glass transition interval, may be controlled and/or adjusted by varying the glass composition makeup of fibers 39. For example, the hardness of glass fibers 39 may be approximately the same as that of substrates 33 and 35, thereby reducing the potential for point or contact scratching, shear, and/or indentation damage to substrate(s) 33 and 35 by the spacers when or after space 37 is evacuated. Glass fibers or strands 39 conduct little heat between the opposing substrates. Moreover, the thermal expansion coefficient and $T_g$ of multi-component glass fibers 39 may be designed to closely match that of substrates 33 and 35, again reducing the likelihood of substrate(s) 33, 35 cracking. Another advantage of the use of glass fibers as spacers 39 is that such fibers may be substantially transparent to visible light, and have a refractive index approximately the same (i.e. within about 10% plus/minus) as the refractive index of glass substrate(s) 33 and 35. These characteristics render glass fibers 39 more invisible to viewers in the viewing area of window unit 31 than conventional opaque metal or ceramic spacers. In sum, many aesthetic characteristics of vacuum IG unit 31 may be improved through the utilization of elongated glass fibers 39 as spacers.

In still further embodiments of this invention, elongated fiber spacers 39 may be made of or include the minerals brucite and/or chrysotile. These materials may also be substantially transparent to certain wavelengths of visible light in some embodiments.

Figure 5:
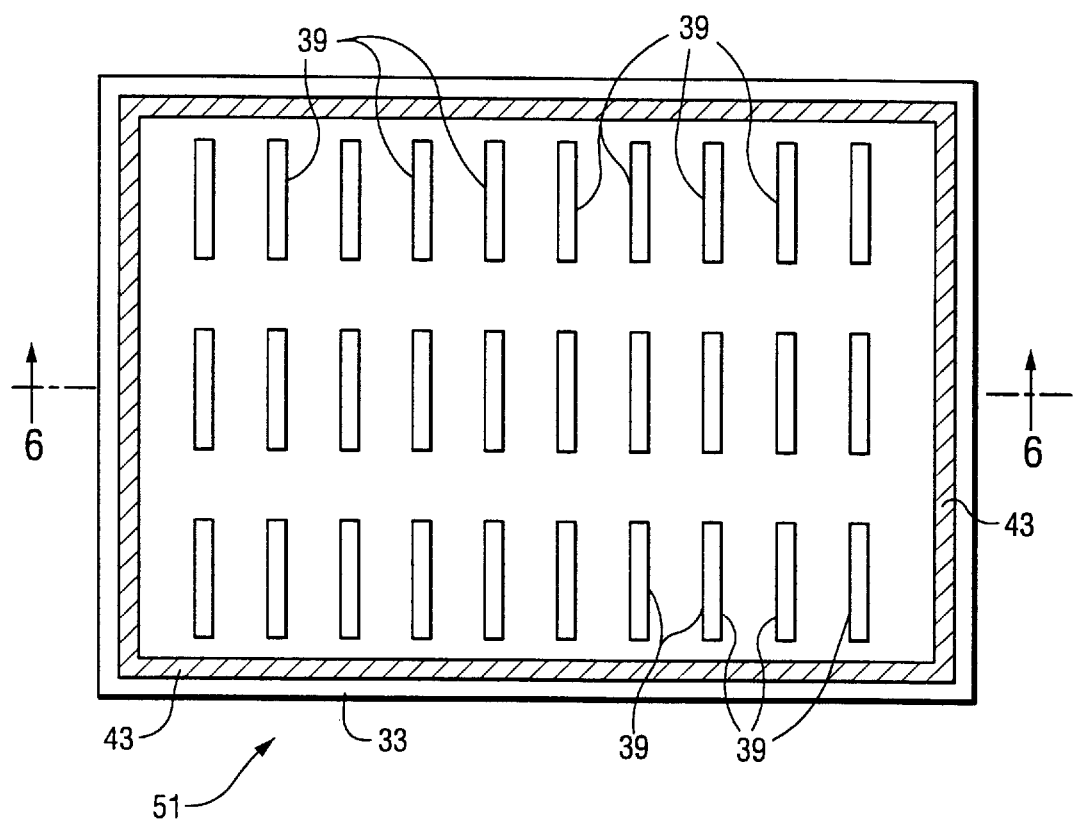
FIG. 5 is a top partial cross-sectional and partial elevation view of a vacuum IG window unit absent its upper substrate according to another embodiment of this invention.
Figure 6:
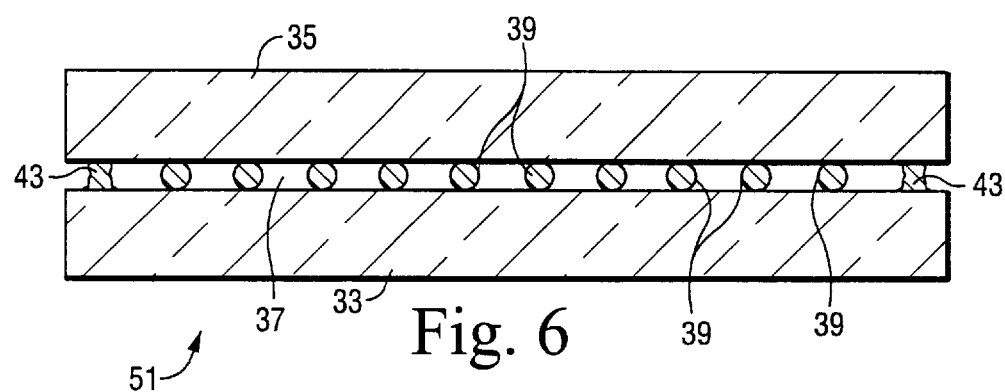
FIG. 6 is a side cross-sectional view of the FIG. 5 vacuum IG window unit taken along section line 6—6 (including the upper substrate).

FIGS. 5–6 illustrate a vacuum IG unit 51 according to another embodiment of this invention. This embodiment is similar to the embodiment of FIGS. 3–4, except that in FIGS. 5–6 additional and shorter elongated fiber spacers 39 are provided. In FIGS. 5–6, fiber spacers 39 are provided in a plurality of aligned rows and columns across the viewing area of window unit 51 to space the substrates 33 and 35 from one another against atmospheric pressure. Fiber spacers 39 provided in the same column are thus aligned approximately coaxial to one another, while many spacers 39 in the same and different rows are aligned approximately parallel to one another in this embodiment.

In still another embodiment of this invention, a plurality of fiber spacers 39 may be randomly distributed or positioned across at least a portion of the viewing area of the window unit between glass substrates 33 and 35. However, fiber spacers 39 are preferably oriented so as to not overlap one another between the substrates 33 and 35. A random distribution of fibers 39 may decrease costs associated with production of the vacuum IG unit.

In each of the embodiments discussed above, elongated fibers 39 are oriented in a horizontal (or laid down) position and maintain the gap of low pressure space 37. However, in alternative embodiments of this invention, each of a plurality of spacers may be comprised of a plurality of fibers bunched or adhered together (e.g. a spacer may be comprised of a member including multiple glass fibers bonded or otherwise adhered to one another in the shape of a sphere, rectangle, cylinder, or the like).

In preferred embodiments of this invention, glass substrates or sheets 33, 35 are thermally or chemically tempered prior to the step of sandwiching the pillars therebetween. However, in alternative embodiments, glass substrates 35, 35 need not be tempered.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A thermally insulating glass panel comprising:

first and second spaced apart glass substrates defining a low pressure space therebetween having a pressure less than atmospheric pressure;

a plurality of elongated glass fiber spacers disposed between said first and second glass substrates across at least a portion of a viewing area of said panel for spacing said substrates from one another in order to maintain a gap of said low pressure space therebetween, said glass fiber spacers extending in only a single direction and thus being parallel to one another; and at least one seal disposed between said first and second glass substrates for hermetically sealing said low pressure space.

2. The glass panel of claim 1, wherein said spacers are substantially transparent to at least certain wavelengths of visible light.

3. The glass panel of claim 1, wherein a plurality of said spacers extend across a substantial dimension of said viewing area of said panel.

4. The glass panel of claim 1, wherein a plurality of said fiber spacers have approximately a circular or oval shape in cross section.

5. The glass panel of claim 1, wherein a plurality of said fiber spacers comprise glass fibers and have a thickness or diameter of from about 0.05 to 0.30 mm in at least one portion thereof.

6. The glass panel of claim 1, wherein said at least one seal is a hermetic edge seal.

7. The glass panel of claim 6, wherein said hermetic edge seal comprises one of solder glass and indium.

8. The glass panel of claim 1, wherein said low pressure space has a pressure no greater than about $0.5 \times 10^{-3}$ Torr.

9. The glass panel of claim 8, wherein a plurality of said fiber spacers are horizontally oriented and transparent to at least about 70% of certain wavelengths of visible light.

10. The glass panel of claim 9, wherein a plurality of said fiber spacers are transparent to at least about 90% of all wavelengths of visible light.

11. The glass panel of claim 9, wherein a refractive index of a plurality of said spacers is approximately equal to a refractive index of at least one of said glass substrates.

12. The panel of claim 1, wherein the glass fiber spacers are solid, and are not hollow.

13. A vacuum IG window unit comprising:

first and second spaced apart substantially transparent glass substrates having a low pressure space therebetween with a pressure less than atmospheric pressure;

a plurality of glass fiber inclusive spacers aligned in only one direction and disposed between said first and second substantially transparent glass substrates for spacing said substrates from one another in order to maintain said low pressure space therebetween; and at least one edge seal disposed between said first and second substantially transparent glass substrates for sealing said low pressure space.

14. The window unit of claim 13, wherein a plurality of said fiber inclusive spacers comprise elongated glass fiber spacers which are transparent to at least about 70% of visible light rays.

15. The window unit of claim 13, wherein the spacers are solid and not hollow.

* * * * *